United States Patent
Wang (10) Patent No.: US 11,516,411 B2
(45) Date of Patent: Nov. 29, 2022

(54) IMAGE PROCESSING METHOD AND APPARATUS, ELECTRONIC DEVICE AND COMPUTER-READABLE STORAGE MEDIUM

(71) Applicant: BEIJING BYTEDANCE NETWORK TECHNOLOGY CO., LTD., Beijing (CN)

(72) Inventor: Jingye Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/672,529

(22) Filed: Feb. 15, 2022

(65) Prior Publication Data

US 2022/0174226 A1   Jun. 2, 2022

Related U.S. Application Data (63) Continuation of application No. PCT/CN2020/106861, filed on Aug. 4, 2020.

(30) Foreign Application Priority Data

Aug. 16, 2019 (CN) .......................... 201910759082.0

(51) Int. Cl.
  *H04N 5/262* (2006.01)
  *G06T 7/215* (2017.01)
  (Continued)

(52) U.S. Cl.
  CPC .............. *H04N 5/2621* (2013.01); *G06T 1/20* (2013.01); *G06T 7/215* (2017.01); *G06V 10/225* (2022.01); *G06V 2201/07* (2022.01)

(58) Field of Classification Search
  CPC ......... H04N 5/2621; G06T 1/20; G06T 7/215; G06V 10/225; G06V 2201/07
  See application file for complete search history.

(56) References Cited

U.S. PATENT DOCUMENTS

2019/0070500 A1   3/2019   Kim et al.

FOREIGN PATENT DOCUMENTS

CN        102074035 A     5/2011
CN        105068748 A    11/2015
(Continued)

OTHER PUBLICATIONS

CN 108833818 Chen et al, machine translated (Year: 2018).*
(Continued)

*Primary Examiner* — Jianxun Yang
(74) *Attorney, Agent, or Firm* — BakerHostetler (57) ABSTRACT

Disclosed are an image processing method and apparatus, an electronic device and a computer-readable storage medium. The method comprises: acquiring a video image; when a preset target is detected in the video image, superimposing a foreground sticker on a target image corresponding to the preset target; and when a preset action of the preset target in the video image is detected, generating a screen special effect, in the embodiments of the present disclosure, a video image is acquired, when a preset target is detected in the video image, a foreground sticker is superimposed on a target image corresponding to the preset target, and when a preset action of the preset target in the video image is detected, a screen special effect is generated, such that a screen special effect for the preset action of the preset target can be realized.

20 Claims, 3 Drawing Sheets

(51) Int. Cl.
*G06V 10/22* (2022.01)
*G06T 1/20* (2006.01)

(56) References Cited

FOREIGN PATENT DOCUMENTS

| | | | |
|---|---|---|---|
| CN | 106210545 | A | 12/2016 |
| CN | 108289180 | A | 7/2018 |
| CN | 108712661 | A | 10/2018 |
| CN | 108833818 | A | 11/2018 |
| CN | 108986017 | A | 12/2018 |
| CN | 109803165 | A | 5/2019 |
| CN | 109889893 | A | 6/2019 |

OTHER PUBLICATIONS

International Patent Application No. PCT/CN2020/106861; Int'l Written Opinion and Search Report; dated Sep. 28, 2020; 7 pages.
European Patent Application No. 20854936.0; Extended Search Report; dated Aug. 8, 2022; 11 pages.

\* cited by examiner

IMAGE PROCESSING METHOD AND APPARATUS, ELECTRONIC DEVICE AND COMPUTER-READABLE STORAGE MEDIUM

The present application is a continuation application of International Patent Application No. PCT/CN2020/106861, titled "IMAGE PROCESSING METHOD AND APPARATUS, ELECTRONIC DEVICE AND COMPUTER-READABLE STORAGE MEDIUM", filed on Aug. 4, 2020, which claims priority to Chinese Patent Application No. 201910759082.0, titled "IMAGE PROCESSING METHOD AND APPARATUS, ELECTRONIC DEVICE AND COMPUTER-READABLE STORAGE MEDIUM", filed on Aug. 16, 2019, with the China National Intellectual Property Administration, both of which are incorporated herein by reference in their entireties.

FIELD

The present disclosure relates to the technical field of image processing, and in particular to an image processing method, an image processing apparatus, an electronic device, and a computer-readable storage medium.

BACKGROUND

With the development of smart terminal technologies, functions of a smart terminal are increasingly diverse. For example, the user may use the smart terminal to live broadcast or shoot a short video. In live broadcast or short video shooting, realization of a preset motion special effect becomes an interesting interactive entertainment.

There is currently no method for achieving a preset motion effect.

SUMMARY

This summary is to introduce concepts in a simplified form that are described in detail in the detailed description that follows. This summary is neither intended to identify key features or essential features of the claimed technical solutions, nor intended to limit the scope of the claimed technical solutions.

An image processing method is provided according to the present disclosure, so as to at least partially solve the technical problem that there is no method for achieving a preset motion effect in the conventional technology. In addition, an image processing apparatus, an image processing hardware apparatus, a computer-readable storage medium and an image processing terminal are also provided.

In order to achieve the above object, the following technical solutions are provided according to an aspect of the present disclosure. An image processing method includes: acquiring a video; superimposing a foreground sticker on a target image corresponding to a preset target when it is detected that the preset target appears in the video; and generating a screen special effect when it is detected that the preset target in the video generates a preset motion.

In order to achieve the above object, the following technical solutions are provided according to an aspect of the present disclosure. An image processing apparatus includes an image acquiring module, a sticker superimposing module and a special effect generating module. The image acquiring module is configured to acquire a video. The sticker superimposing module is configured to superimpose a foreground sticker on a target image corresponding to a preset target when it is detected that the preset target appears in the video. The special effect generating module is configured to generate a screen special effect when it is detected that the preset target in the video generates a preset motion.

In order to achieve the above object, the following technical solutions are provided according to an aspect of the present disclosure. An electronic device includes a memory and a processor. The memory is configured to store non-transitory computer readable instructions. The processor is configured to execute the computer-readable instructions, so that the processor implements the image processing method described above.

In order to achieve the above object, the following technical solutions are provided according to an aspect of the present disclosure. A computer-readable storage medium is configured to store non-transitory computer-readable instructions. When the non-transitory computer-readable instructions are executed by a computer, the computer performs the image processing method described above.

In order to achieve the above object, the following technical solutions are provided according to an aspect of the present disclosure. An image processing terminal includes the image processing apparatus described above.

According to embodiments of the present disclosure, a video is acquired. When it is detected that a preset target appears in the video, a foreground sticker is superimposed on a target image corresponding to the preset target. When it is detected that the preset target in the video image generates a preset motion, a screen special effect is generated, thereby achieving the screen special effect corresponding to the preset motion generated by the preset target.

The above description is only an overview of the technical solutions of the present disclosure. The preferred embodiments are given below, and the detailed description is as follows in conjunction with the accompanying drawings. Therefore, the technical means of the present disclosure are more clearly understood, and can be implemented according to the contents of the specification, and the above and other objects, features and advantages of the present disclosure are more clearly understood.

BRIEF DESCRIPTION OF THE DRAWINGS

The above and other features, advantages and aspects of various embodiments of the present disclosure will become more apparent from the illustrations in conjunction with the accompanying drawings and with reference to the following detailed description. Throughout the drawings, the same or similar reference numbers refer to the same or similar elements. It should be understood that the drawings are illustrative only and that the components and elements are not necessarily drawn to scale.

DETAILED DESCRIPTION OF EMBODIMENTS

Embodiments of the present disclosure are described in more detail below with reference to the drawings. Although some embodiments of the present disclosure are shown in the drawings, it should be understood that the present disclosure may be embodied in various forms and should not be construed as limited to the embodiments set forth herein. These embodiments are provided for a thorough and complete understanding of the present disclosure. It should be understood that the drawings and embodiments of the present disclosure are only for illustrative purposes, and are not intended to limit the protection scope of the present disclosure.

It should be understood that the various steps described in the method embodiments of the present disclosure may be performed in a different order and/or in parallel. Furthermore, method embodiments may include additional steps and/or steps that are not listed. The scope of the present disclosure is not limited in this regard.

The term "including" and variations thereof are open-ended inclusions, that is, "including but not limited to". The term "based on" is "based at least in part on," The term "an embodiment" means "at least one embodiment." The term "another embodiment" means "at least one additional embodiment." The term "some embodiments" means "at least some embodiments." Relevant definitions of other terms are given in the description below.

First Embodiment

Figure 1:
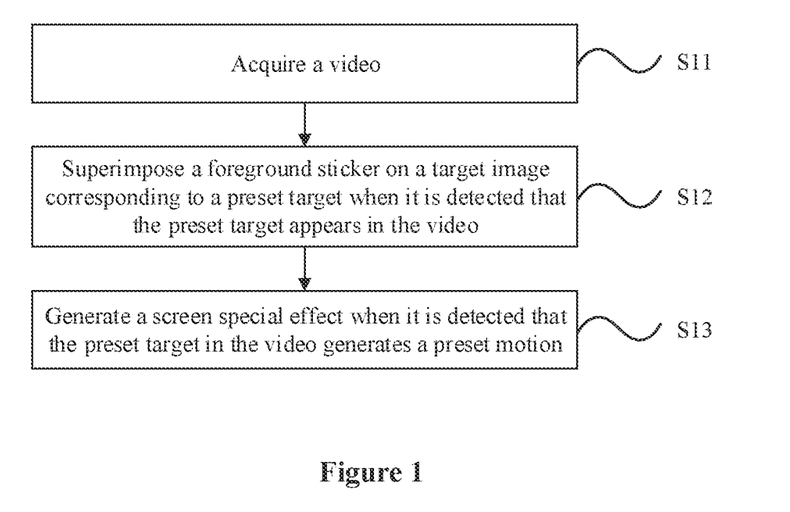
FIG. 1 is a schematic flowchart showing an image processing method according to an embodiment of the present disclosure.

In order to solve the technical problem that there is no method for achieving an effect for a preset motion in the conventional technology, an image processing method is provided according to an embodiment of the present disclosure. As shown in FIG. 1, the image processing method includes steps S11 to S13 as follows.

In step S11, a video is acquired.

The video is a video stream inputted in real time, for example, a live video in a short video application, or a video pre-stored in a terminal. The terminal is a mobile terminal, such as a smart phone and a tablet computer, or a fixed terminal, for example, a desktop computer.

In step S12, when it is detected that a preset target appears in the video, a foreground sticker is superimposed on a target image corresponding to the preset target.

The preset target may be a preset gesture, such as an air punch, a scissor hand, or an ok gesture.

The foreground sticker is a sticker serving as a foreground for the preset target, and may be acquired from the Internet.

Detection is performed on the video based on an existing detection algorithm (for example, a neural network-based target detection algorithm, or a region-based target detection algorithm), to detect an image including the preset target.

In step S13, a screen special effect is generated when it s detected that the preset target in the video generates a preset motion.

The preset motion is associated with the preset target. For example, the preset motion corresponding to the air punch is a punching action.

The screen special effect may be a screen shaking effect and/or a screen special effect image.

The screen special effect image is generated according to the foreground sticker. Alternatively, the screen special effect is an image unrelated to the foreground sticker. The screen special effect image corresponds to the preset motion.

According to the first embodiment of the present disclosure, a video is acquired. When it is detected that a preset target appears in the video, a foreground sticker is superimposed on a target image corresponding to the preset target. When it is detected that the preset target in the video image generates a preset motion, a screen special effect is generated, thereby achieving the screen special effect corresponding to the preset motion generated by the preset target.

In an embodiment, step S13 includes: generating a distorted screen special effect image according to the foreground sticker when it is detected that the preset target in the video generates the preset motion.

The screen special effect image is a vertically distorted foreground sticker, or a horizontally distorted foreground sticker, or a vertically and horizontally distorted foreground sticker.

In an embodiment, the generating a distorted screen special effect image according to the foreground sticker when it is detected that the preset target in the video generates the preset motion includes: for each pixel in the foreground sticker: determining an offset of the pixel in the foreground sticker when it is detected that the preset target in the video generates the preset motion; and moving the pixel in the foreground sticker according to the offset to obtain the distorted screen special effect image.

The offset includes a vertical offset, or a horizontal offset. Alternatively, the offset includes a vertical offset and a horizontal offset.

In an embodiment, the determining an offset of the pixel in the foreground sticker when it is detected that the preset target in the video generates the preset motion includes: acquiring at least one parameter of a height, an offset amplitude, a system time, a distortion coefficient, distortion density and a compensation coefficient of the video when it is detected that the preset target in the video generates the preset motion; and determining the offset of the pixel in the foreground sticker according to the at least one parameter.

The distortion factor is used to control a speed for distortion.

The compensation factor is used to prevent a flicker.

In an embodiment, determining the offset of the pixel in the foreground sticker according to the at least one parameter includes: determining a vertical offset of the pixel in the foreground sticker from an expression $$f(x, y) = \begin{cases} \alpha \sin(\beta t + \delta x) + \varepsilon_1, & y < 0.5 \\ \alpha \sin(\beta t + \delta x) + \varepsilon_2, & y > 0.5 \end{cases}.$$

x is an abscissa of the pixel, for example, a normalized abscissa, y is an ordinate of the pixel, for example, a normalized ordinate. α is the offset magnitude, for example, α=h/15, where h is the height of the video. β is the distortion coefficient for controlling the speed for distortion, for example, 30. t is the system time and has a unit of s. δ is the distortion density, for example, 2.7. $\varepsilon_1$ and $\varepsilon_2$ are compensation coefficients, and sin(.) is sine calculation.

A case that the vertical offset is controlled based on a trigonometric function on the abscissa and the time only may result in a flicker on upper and lower borders. Therefore, the compensation coefficients $\varepsilon_1$ and $\varepsilon_2$ are provided, and are calculated from $\varepsilon_1$=h/3 and $\varepsilon_2$=−h/3, respectively.

In an embodiment, the method further includes the following steps S14 to S15.

In step S14, filter processing is performed on the screen special effect image.

In step S15, the filter-processed screen special effect image is rendered.

In an embodiment, the foreground sticker, the screen special effect, and the filter are arranged sequentially from back to front in a direction facing the screen.

In an embodiment, the foreground sticker includes a first video sequence.

Correspondingly, step S12 includes: selecting a first frame from the first video sequence, as the foreground sticker.

Correspondingly, step S13 includes: according to a superposition progress of the video, periodically selecting frames from other frames rather than the first frame in the first video sequence, as the screen special effect image.

The foreground sticker includes the video sequence. In order to ensure the synchronization of screen effects, a superposition period of the foreground sticker is the same as that of the filter. The period is determined depending on a frame rate of the video.

In an embodiment, the filter includes a second video sequence.

Correspondingly, step S14 includes the following steps S141 to S142.

In step S141, according to the superposition progress of the video, frames are periodically selected from the second video sequence, as a filter image.

The filter is in s multiply mode and includes a video sequence. A new video is used as a filter at 50-millisecond intervals.

In step S142, filter processing is performed on the screen special effect image with the filter image.

In an embodiment, the method further includes: controlling the period by a first timer.

The period is controlled by setting the timer. The timer is activated at preset time intervals (for example, 50 ms).

In an embodiment, after it is detected that the preset target appears in the video, and before superimposing the foreground sticker on the target image corresponding to the preset target, the method further includes: activating a second timer for timekeeping.

In an embodiment, the method further includes: when a time period recorded by the second timer exceeds a preset time period, turning off the filter, the screen special effect, and the superimposed foreground sticker sequentially.

In an embodiment, the foreground sticker, the screen special effect, and the filter are arranged sequentially from back to front in a direction facing the screen.

The direction facing the screen is represented by coordinates in a direction of a three-dimensional coordinate system, for example, the z-axis direction. A coordinate of the foreground sticker, a coordinate of the screen special effect, and a coordinate of the filter are in descending order along the z-axis.

Second Embodiment

Figure 2:
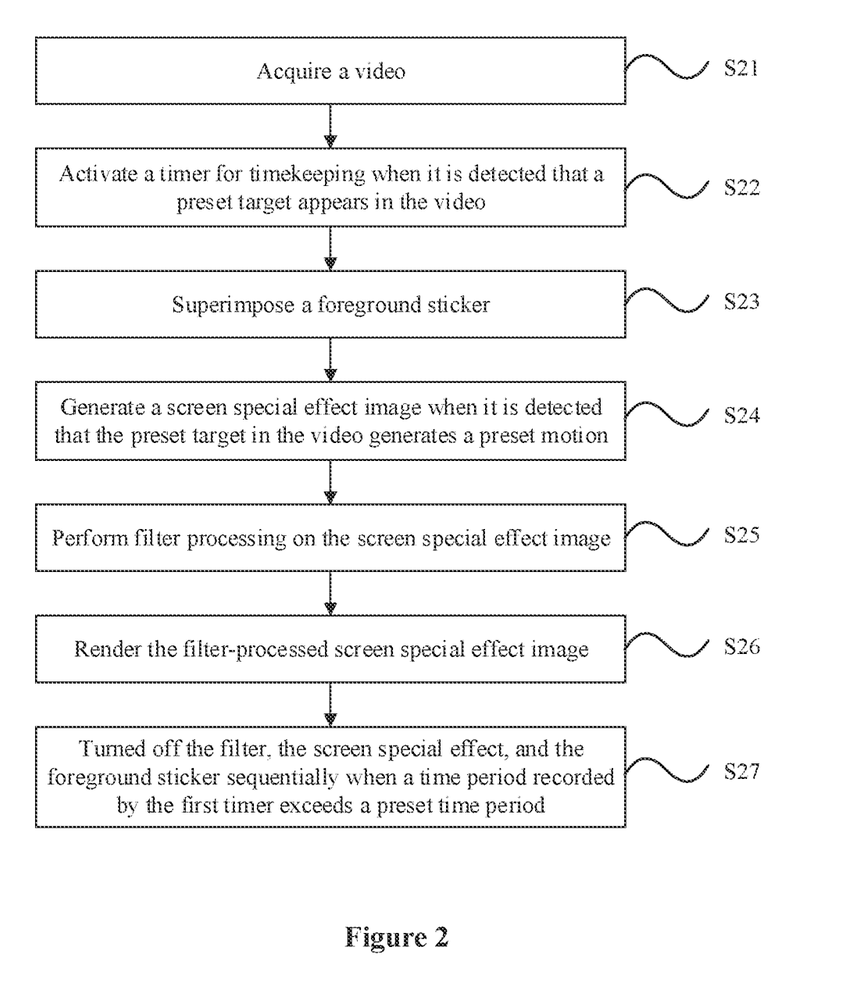
FIG. 2 is a schematic flowchart showing an image processing method according to an embodiment of the present disclosure.

This embodiment is a specific implementation for explaining the present disclosure. As shown in FIG. 2, the image processing method mainly includes the following steps S21 to S25.

In step S21, a video is acquired.

In step S22, when it is detected that a preset target appears in the video, a timer is activated for timekeeping.

In step S23, a foreground sticker is superimposed.

In step S24, when it is detected that the preset target in the video generates a preset motion, a screen special effect image is generated.

In step S25, filter processing is performed on the screen special effect image.

In step S26, the filter-processed screen special effect image is rendered.

When a preset target is detected, the timer starts timekeeping with a time period of 2 seconds. In a process of timekeeping, three special effects are triggered, namely, superposing the foreground sticker, generating the screen special effect and generating the filter special effect. Respective heights of the three special effects are in descending order along the z-axis.

The filter is in s multiply mode and includes a video sequence. A new video is used as a filter at 50-millisecond intervals, which is controlled by setting another timer that is activated at 50-millisecond intervals.

The foreground sticker also includes a video sequence. In order to ensure the synchronization of effects, the same time is activated at 50-millisecond intervals.

In step S27, when a time period recorded by the first timer exceeds a preset time period, the filter, the screen special effect, and the foreground sticker are turned off sequentially.

The preset time period may be 2 s.

It should be understood by those skilled in the art that modifications (for example, a combination of the listed modes) or equivalent substitutions may be made on the basis of the above embodiments.

Although steps in the embodiments of the image processing method are described in the above order, it should be clear to those skilled in the art that the steps in the embodiments of the present disclosure are unnecessarily performed in the above order, and may also be performed in other order such as reversely, in parallel, and alternately. Moreover, those skilled in the art may add other steps based on the above steps, and these modifications or equivalent alternatives should also be included in the protection scope of the present disclosure, and are not repeated herein.

Apparatus embodiments of the present disclosure are described below. The apparatus embodiments of the present disclosure are used to perform the steps implemented by the method embodiments of the present disclosure. For the convenience of description, only the parts related to the embodiments of the present disclosure are shown, and for the technical details are not disclosed in detail, reference is made to the method embodiments of the present disclosure.

Third Embodiment

Figure 3:
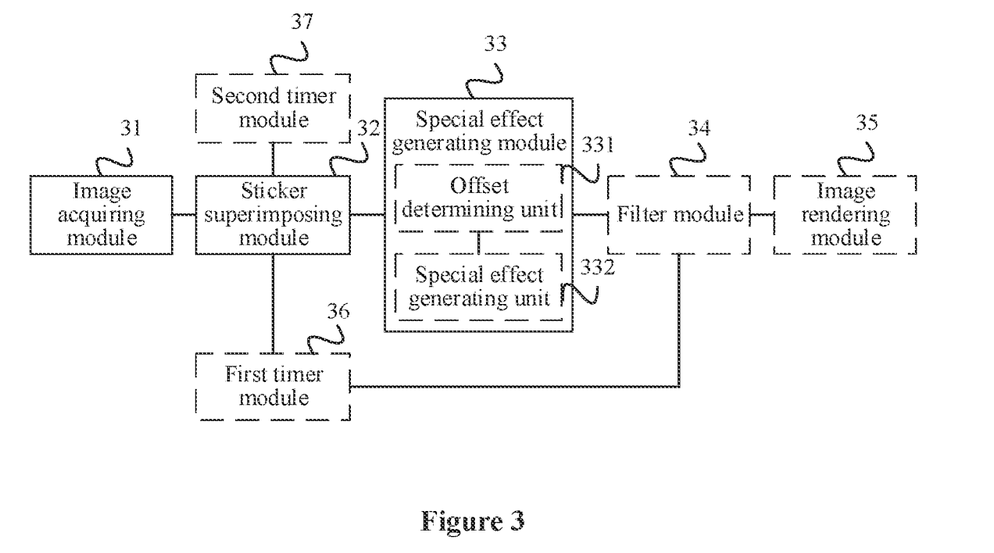
FIG. 3 is a schematic flowchart showing an image processing apparatus according to an embodiment of the present disclosure.

In order to solve the technical problem that there is no method for achieving an effect for a preset motion in the conventional technology, an image processing apparatus is provided according to an embodiment of the present disclosure. The apparatus is configured to perform the steps in the image processing method as described in the first embodiment. As shown in FIG. 3, the apparatus includes an image acquiring module 31, a sticker superimposing module 32, a special effect generating module 33.

The image acquiring module 31 is configured to acquire a video.

The sticker superimposing module 32 is configured to superimpose a foreground sticker on a target image corresponding to a preset target when it is detected that the preset target appears in the video.

The special effect generating module 33 is configured to generate a screen special effect when it is detected that the preset target in the video generates a preset motion.

The special effect generating module 33 is further configured to generate a distorted screen special effect image according to the foreground sticker when it is detected that the preset target in the video generates the preset motion.

The special effect generating module 33 includes an offset determining unit 331 and a special effect generating unit 332.

The offset determining unit 331 is configured to: for each pixel in the foreground sticker, determine an offset of the pixel in the foreground sticker when it is detected that the preset target in the video generates the preset motion.

The special effect generating unit 332 is configured to move the pixel in the foreground sticker according to the offset to obtain the distorted screen special effect image.

The offset determining unit 331 is further configured to: acquire at least one of a height, an offset amplitude, a system time, a distortion coefficient, distortion density and a compensation coefficient of the video when it is detected that the preset target in the video generates the preset motion; and determine the offset of the pixel in the foreground sticker according to the at least one parameter.

The offset determining unit 331 is further configured to: determining a vertical offset of the pixel in the foreground sticker from an expression $$f(x, y) = \begin{cases} \alpha \sin(\beta t + \delta x) + \varepsilon_1, & y < 0.5 \\ \alpha \sin(\beta t + \delta x) + \varepsilon_2, & y > 0.5 \end{cases}.$$

where x is an abscissa of the pixel. y is an ordinate of the pixel. $\alpha$ is the offset magnitude. $\beta$ is the distortion coefficient. t is the system time. $\delta$ is the distortion density. $\varepsilon_1$ and $\varepsilon_2$ are compensation coefficients, and sin(.) is sine calculation.

Further, the apparatus includes a filter module 34 and an image rendering module 35.

The filter module 34 is configured to perform filter processing on the screen special effect image.

The image rendering module 35 is configured to render the filter-processed screen special effect image.

Further, the foreground sticker includes a first video sequence.

Correspondingly, the sticker superimposing module 32 is configured to select a first frame from the first video sequence, as the foreground sticker.

Correspondingly, the special effect generating module 33 is configured to periodically select, according to a superposition progress of the video, frames from other frames rather than the first frame in the first video sequence, as the screen special effect image.

Further, the filter includes a second video sequence.

Correspondingly, the filter module 34 is configured to: periodically select, according to the superposition progress of the video, frames from the second video sequence, as a filter image; and perform the filter processing on the screen special effect image with the filter image.

Further, the apparatus includes: a first timer module 36. The first timer module 36 is configured to control the period by a first timer.

Further, the apparatus includes: a second timer module 37. The second timer module 37 is configured to activate a second timer for timekeeping after it is detected that the preset target appears in the video and before the foreground sticker is superimposed on the target image corresponding to the preset target.

Further, the second timer module 37 is configured to: when a time period recorded by the second timer exceeds a preset time period, turn off the filter, the screen special effect, and the foreground sticker sequentially.

Further, the foreground sticker, the screen special effect, and the filter are arranged sequentially from back to front in a direction facing the screen.

For detailed descriptions of the operation principle and the technical effects achieved by embodiments of the image processing apparatus, reference is made to the relevant descriptions in the foregoing embodiments of the image processing method, which are not described in detail here.

Fourth Embodiment

Figure 4:
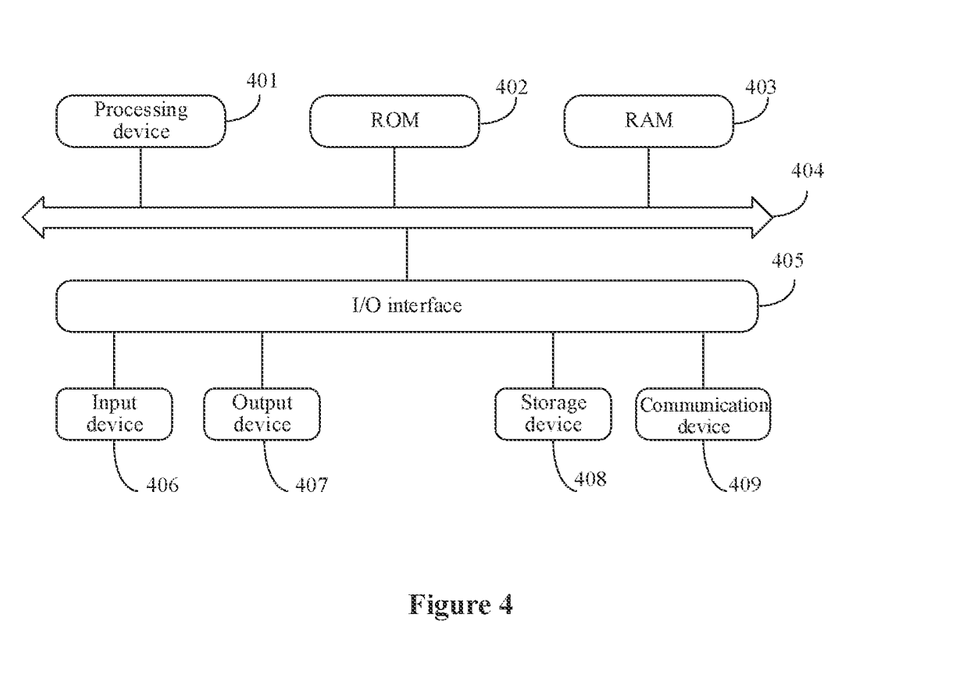
FIG. 4 is a schematic structural diagram showing an electronic device according to an embodiment of the present disclosure.

Reference is made to FIG. 4, which is a schematic structural diagram showing an electronic device 400 for implementing embodiments of the present disclosure. The terminal device in the embodiments of the present disclosure may include but is not limited to a mobile terminal such as a mobile phone, a notebook computer, a digital broadcast receiver, a PDA (personal digital assistant), a PAD (tablet computer), a PMP (portable multimedia stacker), and a vehicle-mounted terminal (for example, a car navigation terminal) and a fixed terminal such as a digital TV, a desktop computer. The electronic device shown in FIG. 4 is only an example, and should impose no limitation on the function and scope of use of the embodiments of the present disclosure.

As shown in FIG. 4, the electronic device 400 includes a processing device (for example, a central processing unit, a graphics processor) 401 that is configured to perform various appropriate actions and processing in accordance with a program stored in a read only memory (ROM) 402 or a program loaded into a random-access memory (RAM) 403 from a storage device 408. In the RAM 403, various programs and data necessary for the operation of the electronic device 400 are stored. The processing device 401, the ROM 402, and the RAM 403 are connected to each other through a bus 404. An input/output (I/O) interface 405 is also connected to bus 404.

Generally, the following devices are connected to the I/O interface 405: an input device 406 including, for example, a touch screen, a touch pad, a keyboard, a mouse, a camera, a microphone, an accelerometer and a gyroscope an output device 407 including, for example, a liquid crystal display (LCD), a speaker and a vibrator a storage device 408 including, for example, a tape and a hard disk; and a communication device 409. The communication device 409 allows electronic device 400 to communicate wirelessly or by wire with other devices to exchange data. Although FIG. 4 shows the electronic device 400 having various means, it should be understood that not all of the illustrated means are required to be implemented or provided. More or fewer means may alternatively be implemented or provided.

In particular, according to embodiments of the present disclosure, the processing described above with reference to the flowcharts may be implemented as computer software programs. For example, a computer program product including a computer program carried on a non-transitory computer readable medium are provided according to embodiments of the present disclosure, and the computer program includes program code for performing the method illustrated in the flowchart. In such embodiments, the computer program may be downloaded and installed from the network via the communication device 409, or from the storage device 408, or from the ROM 402. When the computer program is executed by the processing device 401, the above-mentioned functions defined in the methods of the embodiments of the present disclosure are implemented.

It should be noted that the computer-readable medium mentioned above in the present disclosure may be a computer-readable signal medium or a computer-readable storage medium, or any combination of the two. The computer readable storage medium may be, for example, but not limited to, an electrical, magnetic, optical, electromagnetic, infrared, or semiconductor system, apparatus or device, or a combination of any of the above. Specific examples of the computer readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program capable of being used by or in conjunction with an instruction execution system, apparatus, or device. In the present disclosure, however, the computer-readable signal medium may include a data signal propagated in a baseband or as part of a carrier wave, with computer-readable program code embodied thereon. Such propagated data signal may be in a variety of forms, including but not limited to an electromagnetic signal, an optical signal, or any suitable combination of the foregoing. The computer-readable signal medium may also be any computer-readable medium other than the computer-readable storage medium. The computer-readable signal medium can transmit, propagate, or transport the program for use by or in connection with the instruction execution system, apparatus, or device. The program code embodied on the computer-readable medium may be transmitted through suitable medium including, but not limited to, an electrical wire, an optical fiber cable, an RF (radio frequency) or the like, or any suitable combination of the foregoing.

In some embodiments, the client and the server perform communication based on any currently known or future developed network protocol such as HTTP (hypertext transfer protocol), and may be interconnected with any form or medium of digital data communication (for example, a communication network). Examples of the communication networks include a local area network ("LAN"), a wide area network ("WAN"), the global network (for example, the Internet), and a peer-to-peer networks (for example, the ad hoc peer-to-peer network), as well as any currently known or future development network.

The above computer-readable medium may be included in the above electronic device or may be separate from the electronic device.

The above computer-readable medium carries one or more programs. When executing the one or more programs, the electronic device: acquires a video; superimposes a foreground sticker on a target image corresponding to a preset target when it is detected that the preset target appears in the video; and generates a screen special effect when it is detected that the preset target in the video generates a preset motion.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may execute entirely on a user computer, partly on a user computer, as a stand-alone software package, partly on a user computer and partly on a remote computer, or entirely on a remote computer or server. In the case of a remote computer, the remote computer may be connected to the user computer through any kind of network, including a local area network (LAN) or a wide area network (WAN), or may be connected to an external computer (for example, an Internet connection provided an Internet service provider).

The flowcharts and block diagrams in the drawings illustrate the architecture, functionality, and operation of possible implementations of the system, method and computer program product according to embodiments of the present disclosure. In this regard, each block in the flowcharts or block diagrams represents a module, a program segment, or a portion of code that contains one or more executable instructions for implementing specified logical functions. It should also be noted that, in some alternative implementations, the functions noted in the blocks may be implemented in an order different from the order noted in the drawings. For example, two blocks shown in succession may, in fact, be executed substantially concurrently, or may sometimes be executed in a reverse order, depending upon the functionality involved. It is also noted that each block in the block diagrams and/or flowchart illustrations, and a combination of blocks in the block diagrams and/or flowchart illustrations, may be implemented in a dedicated hardware-based system that performs specified functions or operations, or may be implemented in a combination of dedicated hardware and computer instructions.

The units in the embodiments of the present disclosure may be implemented in a software manner, and may also be implemented in a hardware manner. The name of a unit does not, in any case, qualify the unit itself.

The functions described herein above may be performed, at least in part, by one or more hardware logic components. For example, without limitation, the hardware logic components include: a field programmable gate array (FPGA), an application specific integrated circuit (ASIC), an application specific standard product (ASSP), a system on chip (SOCs), a complex programmable logical device (CPLDs) and the like.

Throughout the present disclosure, a machine-readable medium may be a tangible medium that may contain or store a program for use by or in connection with the instruction execution system, apparatus, or device. The machine-readable medium max be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. Specific examples of the machine-readable storage medium include an electrical connection based on one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

An image processing method is provided according to one or more embodiments of the present disclosure. The method includes:

acquiring a video;

superimposing a foreground sticker on a target image corresponding to a preset target when it is detected that the preset target appears in the video; and generating a screen special effect when it is detected that the preset target in the video generates a preset motion.

Further, the generating a screen special effect when it is detected that the preset target in the video generates a preset motion includes:

generating a distorted screen special effect image according to the foreground sticker when it is detected that the preset target in the video generates the preset motion.

Further, the generating a distorted screen special effect image according to the foreground sticker when it is detected that the preset target in the video generates the preset motion includes: for each pixel in the foreground sticker:

determining an offset of the pixel in the foreground sticker when it is detected that the preset target in the video generates the preset motion; and moving the pixel in the foreground sticker according to the offset to obtain the distorted screen special effect image.

Further, the determining an offset of the pixel in the foreground sticker when it is detected that the preset target in the video generates the preset motion includes:

acquiring at least one parameter of a height, an offset amplitude, a system time, a distortion coefficient, distortion density and a compensation coefficient of the video when it is detected that the preset target in the video generates the preset motion; and determining the offset of the pixel in the foreground sticker according to the at least one parameter.

Further, the determining the offset of the pixel in the foreground sticker according to the at least one parameter includes:

determining a vertical offset of the pixel in the foreground sticker from an expression $$f(x, y) = \begin{cases} \alpha\sin(\beta t + \delta x) + \varepsilon_1, & y < 0.5 \\ \alpha\sin(\beta t + \delta x) + \varepsilon_2, & y > 0.5 \end{cases}$$

where x is an abscissa of the pixel. y is an ordinate of the pixel. $\alpha$ is the offset magnitude. $\beta$ is the distortion coefficient. t is the system time. $\delta$ is the distortion density $\varepsilon_1$ and $\varepsilon_2$ are compensation coefficients, and sin(.) is sine calculation.

Further, the foreground sticker includes a first video sequence, where the superimposing a foreground sticker on a target image corresponding to a preset target when it is detected that the preset target appears in the video includes: selecting a first frame from the first video sequence, as the foreground sticker; and the generating a screen special effect when it is detected that the preset target in the video generates a preset motion includes: periodically selecting, according to a superposition progress of the video, frames from other frames rather than the first frame in the first video sequence, as a screen special effect image.

Further, the method includes:

performing filter processing on the screen special effect image; and rendering the filter-processed screen special effect image.

Further, a filter includes a second video sequence, where the performing filter processing on the screen special effect image includes:

periodically selecting, according to a superposition progress of the video, frames from the second video sequence, as a filter image; and performing the filter processing on the screen special effect image with the filter image.

Further, the method includes:

controlling a period by a first timer.

Further, the method includes:

activating a second timer for timekeeping after it is detected that the preset target appears in the video and before the superimposing the foreground sticker on the target image corresponding to the preset target.

Further, the method includes:

turning off the filter, the screen special effect, and the superimposed foreground sticker sequentially when a time period recorded by the second timer exceeds a preset time period.

Further, a coordinate of the foreground sticker, a coordinate of the screen special effect, and a coordinate of the filter are in descending order in a direction facing a screen.

An image processing apparatus is provided according to one or more embodiments of the present disclosure. The apparatus includes:

an image acquiring module configured to acquire a video;

a sticker superimposing module configured to superimpose a foreground sticker on a target image corresponding to a preset target when it is detected that the preset target appears in the video; and a special effect generating module configured to generate a screen special effect when it is detected that the preset target in the video generates a preset motion.

Further, the special effect generating module is configured to: generate a distorted screen special effect image according to the foreground sticker when it is detected that the preset target in the video generates the preset motion.

Further, the special effect generating module includes:

an offset determining unit configured to determine an offset of the pixel in the foreground sticker when it is detected that the preset target in the video generates the preset motion; and a special effect generating unit configured to move the pixel in the foreground sticker according to the offset to obtain the distorted screen special effect image.

Further, the offset determining unit is configured to: acquire at least one of a height, an offset amplitude, a system time, a distortion coefficient, distortion density and a compensation coefficient of the video when it is detected that the preset target in the video generates the preset motion; and determine the offset of the pixel in the foreground sticker according to the at least one parameter.

Further, the offset determining unit is configured to: determining a vertical offset of the pixel in the foreground sticker from an expression $$f(x, y) = \begin{cases} \alpha\sin(\beta t + \delta x) + \varepsilon_1, & y < 0.5 \\ \alpha\sin(\beta t + \delta x) + \varepsilon_2, & y > 0.5 \end{cases}.$$

where x is an abscissa of the pixel. y is an ordinate of the pixel. $\alpha$ is the offset magnitude. $\beta$ is the distortion coefficient. t is the system time. $\delta$ is the distortion density. $\varepsilon_1$ and $\varepsilon_2$ are compensation coefficients, and sin(.) is sine calculation.

Further, the apparatus includes:

a filter module configured to perform filter processing on the screen special effect image;

and an image rendering module configured to render the filter-processed screen special effect image.

Further, the foreground sticker includes a first video sequence, where the sticker superimposing module is configured to select a first frame from the first video sequence, as the foreground sticker, and the special effect generating module is configured to periodically select, according to a superposition progress of the video, frames from other frames rather than the first frame in the first video sequence, as the screen special effect image.

Further, the filter includes a second video sequence, where the filter module is configured to: periodically select, according to the superposition progress of the video, frames from the second video sequence, as a filter image; and perform the filter processing on the screen special effect image with the filter image.

Further, the apparatus includes:

a first timer module configured to control the period by a first timer.

Further, the apparatus includes:

a second timer module configured to activate a second timer tier timekeeping after it is detected that the preset target appears in the video and before the foreground sticker is superimposed on the target image corresponding to the preset target.

Further, the second timer module is configured to: when a time period recorded by the second timer exceeds a preset time period, turn off the filter, the screen special effect, and the foreground sticker sequentially.

Further, the foreground sticker, the screen special effect, and the filter are arranged sequentially from back to front in a direction facing the screen.

An electronic device is provided according to one or more embodiments of the present disclosure. The electronic device includes:

a memory configured to store non-transitory computer readable instructions; and a processor configured to execute the computer-readable instructions, to cause the processor to implement the image processing method.

A computer-readable storage medium is provided according to one or more embodiments of the present disclosure. The computer-readable storage medium is configured to store non-transitory computer-readable instructions which, when executed by a computer, cause the computer to implement the image processing method.

The above description shows merely preferred embodiments of the present disclosure and an illustration of the technical principles employed. Those skilled in the art should understand that the scope of disclosure involved in the present disclosure is not limited to the technical solutions formed by the specific combination of the above technical features but covers other technical solutions formed by any combination of the above technical features or their equivalents without departing from the above disclosed concept, for example, technical solutions formed by replacing the above features with the technical features disclosed in (but not limited to) the present disclosure with similar functions.

Additionally, although operations are described in a particular order, the operations are unnecessarily performed in the particular order as shown or in a sequential order. Under certain circumstances, multitasking and parallel processing may be advantageous. Likewise, although the above discussion contains several implementation-specific details, these should not be construed as limitations on the scope of the present disclosure. Some features that are described in the context of separate embodiments may be implemented in combination in a single embodiment. Conversely, various features that are described in the context of a single embodiment may also be implemented in multiple embodiments separately or in any suitable sub-combination.

Although the subject matter has been described in language specific to structural features and/or logical acts of method, it should be understood that the subject matter defined in the appended claims is unnecessarily limited to the specific features or acts described above. In fact, the specific features and acts described above are merely example forms of implementing the claims.

The invention claimed is:

1. An image processing method, comprising:

acquiring a video;

superimposing a foreground sticker on a target image corresponding to a preset target when it is detected that the preset target appears in the video, wherein there is a first video sequence, and wherein the superimposing a foreground sticker on a target image corresponding to a preset target when it is detected that the preset target appears in the video further comprises selecting a first frame from the first video sequence as the foreground sticker;

generating a screen special effect when it is detected that the preset target in the video generates a preset motion, wherein the generating a screen special effect when it is detected that the preset target in the video generates a preset motion further comprises periodically selecting, according to a superposition progress of the video, frames from other frames rather than the first frame in the first video sequence as a screen special effect image; and wherein the foreground sticker, the screen special effect, and a filter are arranged sequentially from back to front in a direction facing a screen.

2. The method according to claim 1, wherein the generating a screen special effect when it is detected that the preset target in the video generates a preset motion comprises:

generating a distorted screen special effect image according to the foreground sticker when it is that the preset target in the video generates the preset motion.

3. The method according to claim 2, wherein the generating a distorted screen special effect image according to the foreground sticker when it is detected that the preset target in the video generates the preset motion comprises: for each pixel in the foreground sticker:

determining an offset of the pixel in the foreground sticker when it is detected that the preset target in the video generates the preset motion; and moving the pixel in the foreground sticker according to the offset to obtain the distorted screen special effect image.

4. The method according to claim 3, wherein the determining an offset of the pixel in the foreground sticker when it is detected that the preset target in the video generates the preset motion comprises:

acquiring at least one parameter of a height, an offset amplitude, a system time, a distortion coefficient, distortion density and a compensation coefficient of the video when it is detected that the preset target in the video generates the preset motion; and determining the offset of the pixel in the foreground sticker according to the at least one parameter.

5. The method according to claim 4, wherein the determining the offset of the pixel in the foreground sticker according to the at least one parameter comprises:

determining a vertical offset of the pixel in the foreground sticker from an expression $$f(x, y) = \begin{cases} \alpha\sin(\beta t + \delta x) + \varepsilon_1, & y < 0.5 \\ \alpha\sin(\beta t + \delta x) + \varepsilon_2, & y > 0.5 \end{cases}$$

wherein x is an abscissa of the pixel, y is an ordinate of the pixel, $\alpha$ is the offset magnitude, $\beta$ is the distortion coefficient, t is the system time, $\delta$ is the distortion density, $\varepsilon_1$ and $\varepsilon_2$ are compensation coefficients, and sin(.) is sine calculation.

6. The method according to claim 2, further comprising:
performing filter processing on the screen special effect image; and
rendering the filter-processed screen special effect image.

7. The method according to claim 6, wherein a filter comprises a second video sequence, and wherein
the performing filter processing on the screen special effect image comprises: periodically selecting, according to a superposition progress of the video, frames from the second video sequence, as a filter image; and performing the filter processing on the screen special effect image with the filter image.

8. The method according to claim 6, further comprising:
activating a second timer for timekeeping after it is detected that the preset target appears in the video and before the superimposing the foreground sticker on the target image corresponding to the preset target.

9. The method according to claim 8, further comprising:
turning off the filter, the screen special effect, and the superimposed foreground sticker sequentially when a time period recorded by the second timer exceeds a preset time period.

10. The method according to claim 1, further comprising:
controlling a period by a first timer.

11. An image processing apparatus for a preset motion, comprising:
a memory configured to store non-transitory computer readable instructions; and
a processor configured to execute the computer-readable instructions, to cause the processor to implement operations comprising:
acquiring a video;
superimposing a foreground sticker on a target image corresponding to a preset target when it is detected that the preset target appears in the video, wherein there is a first video sequence, and wherein the superimposing a foreground sticker on a target image corresponding to a preset target when it is detected that the preset target appears in the video further comprises selecting a first frame from the first video sequence as the foreground sticker;
generating a screen special effect when it is detected that the preset target in the video generates a preset motion, wherein the generating a screen special effect when it is detected that the preset target in the video generates a preset motion further comprises periodically selecting, according to a superposition progress of the video, frames from other frames rather than the first frame in the first video sequence as a screen special effect image; and
wherein the foreground sticker, the screen special effect, and a filter are arranged sequentially from back to front in a direction facing a screen.

12. The apparatus according to claim 11, wherein the processor configured to execute the computer-readable instructions, to cause the processor to implement operation comprising:
generating a distorted screen special effect image according to the foreground sticker when it is detected that the preset target in the video generates the preset motion.

13. The apparatus according to claim 12, wherein the processor configured to execute the computer-readable instructions, to cause the processor to implement operation comprising: for each pixel in the foreground sticker:
determining an offset of the pixel in the foreground sticker when it is detected that the preset target in the video generates the preset motion; and
moving the pixel in the foreground sticker according to the offset to obtain the distorted screen special effect image.

14. The apparatus according to claim 13, wherein the processor configured to execute the computer-readable instructions, to cause the processor to implement operations comprising:
acquiring at least one parameter of a height, an offset amplitude, a system time, a distortion coefficient, distortion density and a compensation coefficient of the video when it is detected that the preset target in the video generates the preset motion; and
determining the offset of the pixel in the foreground sticker according to the at least one parameter.

15. The apparatus according to claim 14, wherein the processor configured to execute the computer-readable instructions, to cause the processor to implement operation comprising:
determining a vertical offset of the pixel in the foreground sticker from an expression $$f(x, y) = \begin{cases} \alpha\sin(\beta t + \delta x) + \varepsilon_1, & y < 0.5 \\ \alpha\sin(\beta t + \delta x) + \varepsilon_2, & y > 0.5 \end{cases}$$

wherein x is an abscissa of the pixel, y is an ordinate of the pixel, $\alpha$ is the offset magnitude, $\beta$ is the distortion coefficient, t is the system time, $\delta$ is the distortion density, $\varepsilon_1$ and $\varepsilon_2$ are compensation coefficients, and sin(.) is sine calculation.

16. The apparatus according any one of claim 12, wherein the processor configured to execute the computer-readable instructions, to cause the processor to implement operations comprising:
performing filter processing on the screen special effect image; and
rendering the filter-processed screen special effect image.

17. A non-transitory computer-readable storage medium configured to store non-transitory computer-readable instructions which, when executed by a computer, cause the computer to implement operations comprising:
acquiring a video:
superimposing a foreground sticker on a target image corresponding to a preset target when it is detected that the preset target appears in the video, wherein there is a first video sequence, and wherein the superimposing a foreground sticker on a target image corresponding to a preset target when it is detected that the preset target appears in the video further comprises selecting a first frame from the first video sequence as the foreground sticker;
generating a screen special effect when it is detected that the preset target in the video generates a preset motion, wherein the generating a screen special effect when it is detected that the preset target in the video generates a preset motion further comprises periodically selecting, according to a superposition progress of the video, frames from other frames rather than the first frame in the first video sequence as a screen special effect image; and wherein the foreground sticker, the screen special effect, and a filter are arranged sequentially from back to front in a direction facing a screen.

18. The non-transitory computer-readable storage medium of claim 17, the operations further comprising:

generating a distorted screen special effect image according to the foreground sticker when it is detected that the preset target in the video generates the preset motion.

19. The non-transitory computer-readable storage medium of claim 18, the operation further comprising: for each pixel in the foreground sticker, determining an offset of the pixel in the foreground sticker when it is detected that the preset target in the video generates the preset motion; and moving the pixel in the foreground sticker according to the offset to obtain the distorted screen special effect image.

20. The non-transitory computer-readable storage medium of claim 19, the operation further comprising:

acquiring at least one parameter of a height, an offset amplitude, a system time, a distortion coefficient, distortion density and a compensation coefficient of the video when it is detected that the preset target in the video generates the preset motion; and determining the offset of the pixel in the foreground sticker according to the at least one parameter.

\* \* \* \* \*